US010636335B2

(12) United States Patent
Kis-Benedek Pinero et al.

(10) Patent No.: US 10,636,335 B2
(45) Date of Patent: Apr. 28, 2020

(54) PORTABLE DISPLAY DEVICE AND SYSTEM

(71) Applicants: Ildikó Kis-Benedek Pinero, El Cajon, CA (US); Gyula Kis-Benedek, Gyöngyössolymos (HU)

(72) Inventors: Ildikó Kis-Benedek Pinero, El Cajon, CA (US); Gyula Kis-Benedek, Gyöngyössolymos (HU)

( * ) Notice: Subject to any disclaimer, the term of this patent is extended or adjusted under 35 U.S.C. 154(b) by 252 days.

(21) Appl. No.: 15/318,346

(22) PCT Filed: Jun. 11, 2015

(86) PCT No.: PCT/US2015/035351
§ 371 (c)(1),
(2) Date: Dec. 12, 2016

(87) PCT Pub. No.: WO2015/191866
PCT Pub. Date: Dec. 17, 2015

(65) Prior Publication Data
US 2017/0132960 A1    May 11, 2017

Related U.S. Application Data

(60) Provisional application No. 61/997,924, filed on Jun. 13, 2014.

(51) Int. Cl.
*B60R 11/02*    (2006.01)
*G09G 5/36*    (2006.01)
(Continued)

(52) U.S. Cl.
CPC .......... *G09F 21/04* (2013.01); *B60R 11/0235* (2013.01); *G06F 1/1637* (2013.01);
(Continued)

(58) Field of Classification Search
None
See application file for complete search history.

(56) References Cited

U.S. PATENT DOCUMENTS

| 2,836,914 A | 6/1958 | Nelson |
| 3,475,045 A | 10/1969 | Cordes |

(Continued)

FOREIGN PATENT DOCUMENTS

| AU | 2010251777 | 5/2014 |
| GB | 2386463 A | 9/2003 |

(Continued)

OTHER PUBLICATIONS

International Search Report and Written Opinion in International Application No. PCT/US2015/035351, dated Sep. 17, 2015.
(Continued)

*Primary Examiner* — Stephen T. Reed
(74) *Attorney, Agent, or Firm* — Law Office of Scott C Harris Inc

(57) ABSTRACT

Portable display systems, devices, and methods are disclosed. A portable display device can be attached to a moving object such as a vehicle and can include one or more digital displays for displaying images. A portable display device can communicate with external devices and display images based on the geographic location of the portable display device. The portable display device may also have several moving components for moving the digital displays between an upright position and a retracted position.

25 Claims, 10 Drawing Sheets

(51) Int. Cl.
*G09G 5/38* (2006.01)
*G09F 21/04* (2006.01)
*G06F 1/16* (2006.01)
*G09F 9/33* (2006.01)
*G09F 9/35* (2006.01)

(52) U.S. Cl.
CPC .......... *G06F 1/1681* (2013.01); *G09G 5/363* (2013.01); *G09G 5/38* (2013.01); *G09F 9/33* (2013.01); *G09F 9/35* (2013.01); *G09G 2300/04* (2013.01); *G09G 2320/08* (2013.01); *G09G 2354/00* (2013.01); *G09G 2380/10* (2013.01)

(56) References Cited

U.S. PATENT DOCUMENTS

| | | |
|---|---|---|
| 4,052,806 A | 10/1977 | George |
| 4,064,502 A | 12/1977 | Saylor et al. |
| 5,010,670 A | 4/1991 | Minervini |
| 5,365,687 A | 11/1994 | Sclater |
| 5,433,026 A | 7/1995 | McDermott et al. |
| 6,145,230 A | 11/2000 | Holmberg |
| 7,143,533 B2 * | 12/2006 | Burke .................... G09F 21/04 40/591 |
| 7,737,912 B2 | 6/2010 | Graef et al. |
| 7,877,913 B1 | 2/2011 | King |
| 8,376,581 B2 | 2/2013 | Auld et al. |
| 8,649,161 B2 | 2/2014 | Kazanuri |
| 9,036,336 B2 | 5/2015 | Takashi et al. |
| 2004/0036622 A1 | 2/2004 | Dukach et al. |
| 2005/0034340 A1 | 2/2005 | McManus |
| 2005/0083403 A1 | 4/2005 | Flores et al. |
| 2008/0030427 A1 * | 2/2008 | Lanham .................. G06Q 30/02 345/2.3 |
| 2008/0236007 A1 | 10/2008 | Au et al. |
| 2011/0099075 A1 * | 4/2011 | Hannon ............. G06Q 30/0272 705/14.68 |
| 2011/0316298 A1 | 12/2011 | Kenrick |

FOREIGN PATENT DOCUMENTS

| | | |
|---|---|---|
| RU | 77087 U1 | 10/2008 |
| SE | 9900832 A | 9/2000 |
| WO | WO 2005/093699 | 10/2005 |
| WO | WO 2008/047970 | 4/2008 |
| WO | WO 2012/035362 A1 | 3/2012 |

OTHER PUBLICATIONS

Higgins, J.R., "Wide Load and Specialty Vehicle Signs." http://www.jrhiggins.com/vehicle-signs/speciality-vehicle-signs. Retrieved on Aug. 19, 2015.

Asram, Dongguan. "led taxi display sign/taxi led signs boards/taxi led screen sign," http://www.alibaba.com/product-detail/led-taxi-display-sign-taxi-led_878785760.html, Retrieved on Aug. 19, 2015.

Ryham, Shenzhen. "Multi color taxi roof double sides screen led board car display sign, IP65 video and graphic function," http://www.alibaba.com/product-detail/Multi-color-taxi-roof-double-sides_60115128167.html, Retrieved on Aug. 19, 2015.

* cited by examiner

PORTABLE DISPLAY DEVICE AND SYSTEM

INCORPORATION BY REFERENCE TO ANY PRIORITY APPLICATIONS

This application is a U.S. National Phase Application of PCT International Application No. PCT/US2015/035351 filed on Jun. 11, 2015 and entitled "PORTABLE DISPLAY DEVICE AND SYSTEM," which claims priority to U.S. Provisional Patent Application Ser. No. 61/997,924 filed on Jun. 13, 2014 and entitled "Automatically or manually collapsible and/or retractable, or static-not collapsible, complete system of mobile display message and/or sponsored board, assembled onto vehicle (car-tops and/or roof racks), digital or not, may or may not have automatically programmable or centrally controlled message feeds and operating business concept." The disclosures of the above-referenced applications are hereby expressly incorporated by reference in their entireties.

BACKGROUND OF THE INVENTION

Field of the Invention

The present invention relates generally to advertisements, and more specifically to portable advertisement devices, systems, and methods.

Description of the Related Art

The placement of an advertisement on a motor vehicle allows for extensive visibility over a widespread geographic area. Current vehicle advertisements include vinyl decals, magnetic signs, and permanent or removable mounted signs. Permanent advertisements, such as vinyl decals or permanent mounted signs can be undesirable to drivers who would like to use their vehicles for purposes other than advertising. Furthermore, some homeowners' associations and neighborhood covenants may regulate advertisements on vehicles parked outdoors. Such regulations may restrict the use of advertisements and may require drivers to remove temporary advertisements, such as magnetic signs and removable mounted signs, after parking, causing drivers to have to reattach the advertisements before future use.

SUMMARY OF THE INVENTION

In accordance with one aspect of the present invention, a portable display device is provided. In one embodiment, the portable display device includes one or more digital display screens configured to transit between a display position and a closed position and to display images when in the display position, a memory configured to store a plurality of images, and a processor configured, in response to occurrence of a pre-defined condition, to select one or more of the plurality of images stored in the memory and instruct the one or more digital displays to display the selected images.

The portable display device can also include a communication module configured to receive data from an external device. In some embodiments, the received data can include the plurality of images. In some embodiments, the communication module is configured to receive one or more of the pre-defined conditions for displaying selected images on the portable display device, and the instructing of the one or more digital displays is done in accordance with the pre-defined condition. The pre-defined condition can be based on a signal from an external device. The portable display device can further include a location sensor configured to obtain geographic location information including one or more of geographic location related data and a determined location of the portable display device. In some embodiments, the pre-defined condition is based on the geographic location information. In some embodiments, the location sensor includes a global positioning system device. In some embodiments, the location sensor includes a radio-frequency identification device. In some embodiments, the pre-defined condition is based on time. The portable display device can further include one or more power sources configured to provide power to one or more components of the portable display device. The portable display device can also include one or more condition sensors configured to detect data related to the condition of the portable display device. In some embodiments, the condition sensors include one or more of an accelerometer, a temperature sensor, a gyroscope, a barometer, a motion sensor, a proximity sensor, a clock, and a timer.

In some embodiments, the portable display device further includes one or more wings, each wing configured to house one of the digital displays, and one or more motors mechanically connected to the one or more wings, the motors configured to cause the transit of the one or more wings between the display and closed condition. The portable display device can further include one or more arms, each arm mechanically connected to one of the wings and to one of the motors, wherein the motors are configured to cause the arms to exert a force on the wings. In some embodiments, the processor is configured to instruct the one or more motors to activate in response to receiving an activation signal at the portable display device. The activation signal can include one or more of a signal from an external device, a selection on a user interface of the portable display device, the starting of a vehicle, the presence of the portable display device in a particular geographic location, and data detected by one or more condition sensors. The portable display device can further include one or more mounting bases configured to mount the portable display device to an object. In some embodiments, the mounting bases are configured to mount to a vehicle extrusion. In some embodiments, the portable display device further includes a security system, the security system comprising one or more of locks, tracking devices, cameras, and kill switches.

In accordance with another aspect of the present invention, a method for displaying an image using a portable display device is provided. In one embodiment, the method includes obtaining external condition information, selecting one or more images from a plurality of stored images, the selecting based on the obtained external condition information, moving display components of the portable display device from a closed configuration to a display configuration based on the determined external condition information, and displaying the selected images on a portable display device.

The method can further include receiving the plurality of stored images from an external device. In some embodiments, the external condition information includes geographic location information. In some embodiments, the obtaining location information includes receiving location information at a location sensor of the portable display device. In some embodiments, the external condition information includes time. The external condition information can also include a signal from an external device. The method can further include receiving an activation signal, wherein the moving display components of the portable display device is done in response to receiving the activation signal. The activation signal can include one or more of a signal from an external device, a selection on a user interface of the portable display device, the starting of a vehicle, the presence of the portable display device in a particular geographic location, and data detected by one or more condition sensors. In some embodiments, the obtaining external condition information is performed in response to the receiving the activation signal. The method can further include terminating the displaying based on one or more of a signal from an external device, a selection on a user interface of the portable display device, the turning off of a vehicle, the presence of the portable display device in a particular geographic location, and data detected by one or more condition sensors. The method can further include moving display components of the portable display device from a display configuration to a closed configuration based on one or more of a signal from an external device, a selection on a user interface of the portable display device, the turning off of a vehicle, the presence of the portable display device in a particular geographic location, the activation of an override switch, and data detected by one or more condition sensors. The method can also include receiving one or more conditions for displaying the selected images on the portable display device, wherein the displaying the selected images is performed in accordance with the received conditions. In some embodiments, the one or more conditions include one or more of time conditions, distance conditions, cost conditions, and vehicle conditions.

In accordance with another aspect of the invention, a system for displaying images is provided. In one embodiment, the system includes a portable display device, the portable display device including a communication module configured to transmit and receive data, a memory configured to store data, the memory configured to store one or more images, and one or more digital displays configured to display images. The system also include an external device, the external device configured to transmit and receive data, the external device configured to transmit image related data to the communication module, the image related data including one or more of images, image-location associations, and image instructions, wherein the portable display device displays images based at least in part on the image related data received from the external device.

The system can further include a location sensor configured to obtain location information, the location information including one or more of geographic location related data and a determined geographic location. The location sensor can be configured to determine the geographic location of the location sensor based on the geographic location related data. The location sensor can also be configured to transmit one or more of the geographic location related data and the determined geographic location to one or more of the external device and the communication module. The external device can be configured to store a plurality of images, wherein each of the plurality of images is associated with a geographic location, wherein upon receiving the geographic location, the external device transmits the images associated with the geographic location to the portable display device. In some embodiments, a processor of the portable display device is configured to determine the geographic location of the location sensor based on the geographic location related data. The system can further include a vehicle, wherein the portable display device is configured to be secured to the vehicle. In some embodiments, the memory is configured to store data relating to the previous display of images. The portable display device can also be configured to transmit the data relating to the previous display of images to the external device.

In accordance with another aspect of the invention, a method for publically presenting information is provided. In one embodiment, the method includes receiving conditions for public display of information at a processor, determining, by a processor, an occurrence of a received condition, selecting, by a processor, one or more images to be displayed from among a plurality of images stored in a hardware storage device, operating a display device to change it from a closed position to a display position, and displaying the selected one or more images when the display device is in the display position and in response to the determined occurrence.

The method can further include storing the conditions for public display on a memory of the display device. The conditions for public display can include one or more geographic locations at which to display the selected one or more images. The conditions for public display can also include one or more of time conditions, distance conditions, cost conditions, and vehicle conditions. In some embodiments, the display device can be configured to be secured to a vehicle.

In accordance with another aspect of the invention, a display device configured to be secured to a vehicle is provided. In one embodiment, the display device includes a sensor configured to sense one or more conditions and a controller responsive to the sensor configured to cause a movement of the display device between a closed position and a display position based on a sensed condition.

The sensed condition can be an obstacle in the path of the display device, wherein the movement is from the display position to the closed position to avoid contact with the obstacle. The sensed condition can also be the starting of the vehicle, wherein the movement is from the closed position to the display position. The sensed condition can also be the turning off of the vehicle, wherein the movement is from the display condition to the closed position. The display device can further include one or more mounting bases wherein the mounting bases are configured to mount to an extrusion of the vehicle.

DETAILED DESCRIPTION OF THE PREFERRED EMBODIMENT

Various aspects of the novel systems, apparatuses, and methods are described more fully hereinafter with reference to the accompanying drawings. Aspects of this disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the novel systems, apparatuses, and methods disclosed herein, whether implemented independently of or combined with any other aspect. For example, an apparatus may be implemented or a method may be practiced using any number of the aspects set forth herein. In addition, the scope is intended to encompass such an apparatus or method which is practiced using other structure, functionality, or structure and functionality in addition to or other than the various aspects set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wired and wireless technologies, system configurations, networks, including optical networks, hard disks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Although various forms of media can be displayed on a portable display device, including, but not limited to, static images and videos, any media that can be displayed on a portable display device may be referred to as an "image" hereinafter.

Although various persons may use, operate, or maintain a portable display device or a portable display system, including, but not limited to, advertisers, advertising companies, drivers, system operators, information technology technicians, service technicians, security personnel, emergency services personnel, advertisement sellers, portable display device retailers, and public safety officials, any operator, user, or maintenance personnel may be referred to as a "user" hereinafter.

Figure 1:
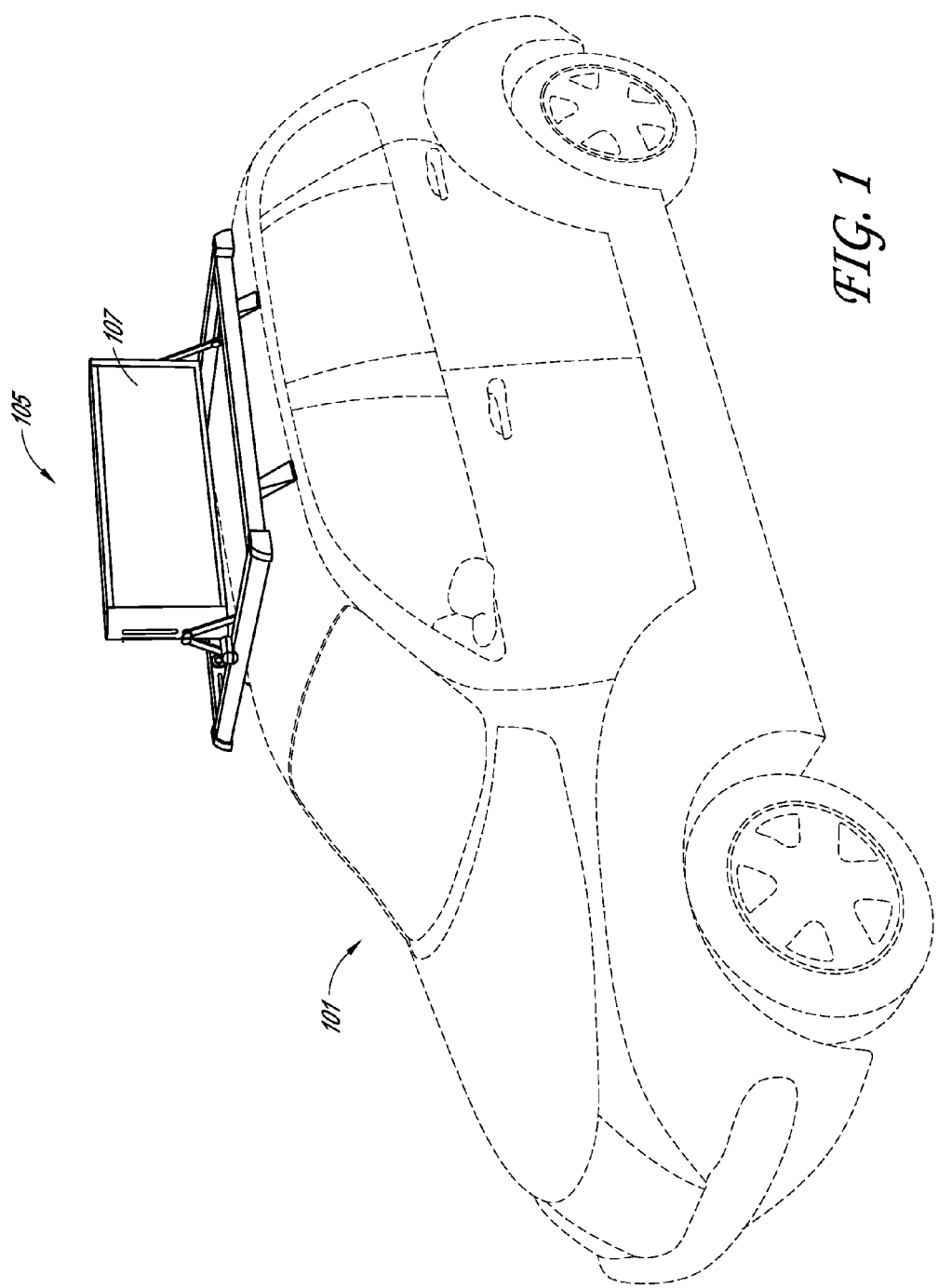
FIG. 1 is a perspective view of an illustrative embodiment of a portable display device secured to a vehicle.

FIG. 1 illustrates an exemplary embodiment of a portable display device 105 secured to a vehicle 101. The portable display device 105 can include one or more digital display screens 107 that can display one or more images. In some embodiments, the one or more images can comprise advertisements. The digital display screens 107 can be adjustable so that the digital display screens can extend to an upright position wherein the digital display screens are visible from outside of the vehicle 101 and can retract so that the digital display screens are oriented substantially parallel to the roof of the vehicle 101.

The portable display device 105 can also comprise one or more location sensors (not shown) for tracking the location of the portable display device 105, and a communication module (not shown) for communicating with one or more external devices. One or more images can be correlated with one or more geographic locations. When the portable display device 105 is in the upright position, the one or more images can be displayed on the portable display device 105 based on the geographic location of the vehicle 101.

The vehicle 101 can comprise a car, truck, train, boat, airplane, blimp, bicycle, or any other vehicle. The portable display device 105 is not limited to securement to a vehicle, but instead can be secured to any object capable of motion.

Figure 2:
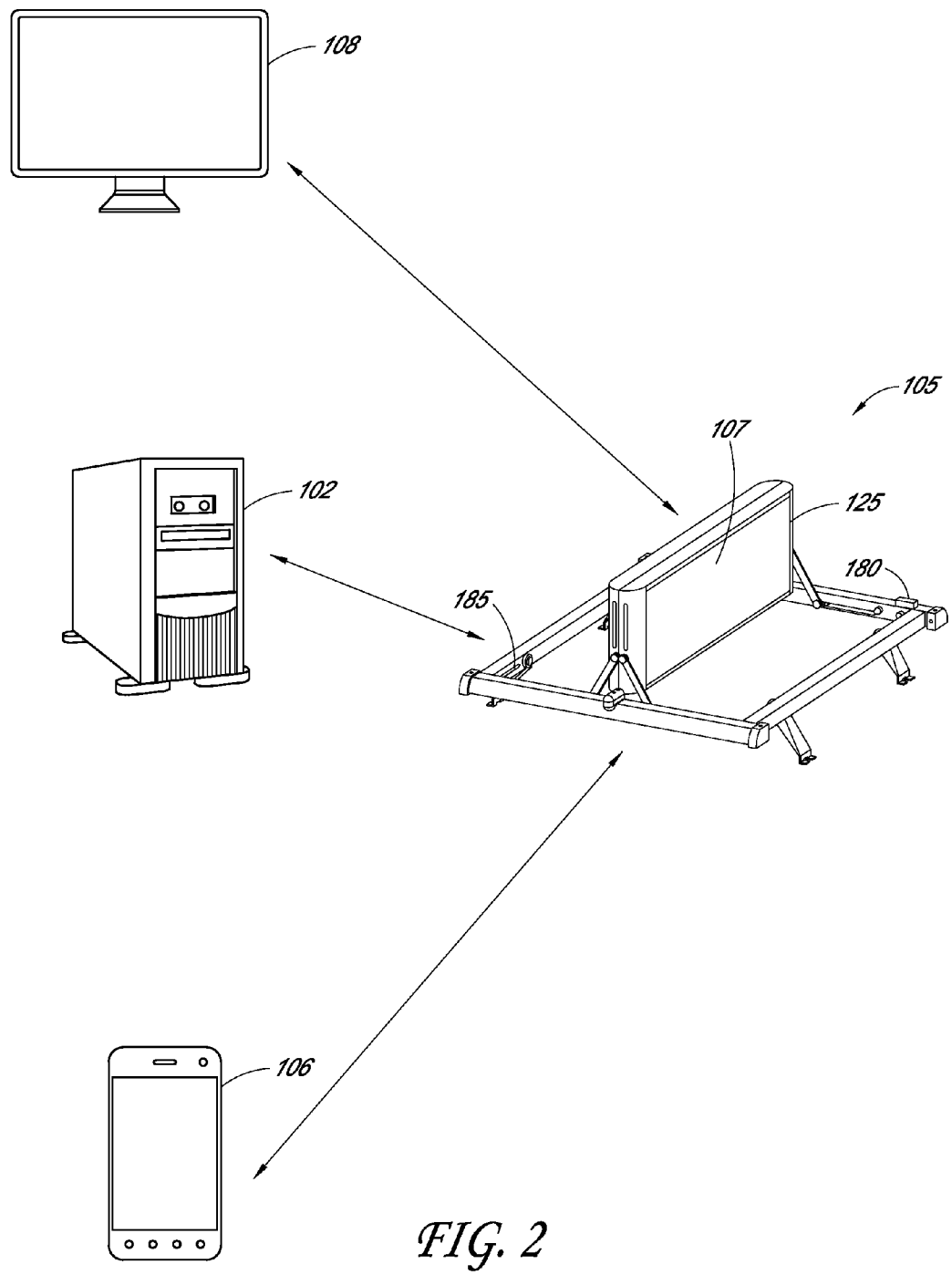
FIG. 2 is a system diagram of an illustrative embodiment of a portable display system including a portable display device.

FIG. 2 illustrates an exemplary embodiment of a portable display system 100. The portable display system 100 includes a server 102, the portable display device 105, a mobile device 106, and a computing device 108. The portable display device 105 can transmit to and receive information from one or more external devices, such as the server 102, the mobile device 106, and the computing device 108.

In accordance with an exemplary embodiment of the present invention, the portable display device 105 further comprises a location sensor 180, a communication module 185, and one or more digital displays 125. The location sensor 180 detects location data for the portable display device 105. The location data can include one or more signals from satellites or other external devices, one or more times or time intervals, one or more locations or coordinates of satellites or other external devices, or any other data that can be used to calculate a location. The location data can be used to determine a location of the portable display device 105. In some embodiments, the location sensor 180 comprises software for calculating the location of the portable display device 105 using the location data. In some embodiments, the portable display device 105 comprises software that can be used to calculate the location of the portable display device and a processor (not shown) for computing the location of the portable display device 105 using the software. In some embodiments, the location data can be transmitted to one or more external devices such as the server 102, the mobile device 106, and the computing device 108 by one or more of the communication module 185 or a communication module of the location sensor 180. In such embodiments, the location of the portable display device 105 can be computed using software on the external devices.

One or more of the server 102, the portable display device 105, the computing device 108, and the mobile device 106 can also store a plurality of image related data. The image related data can include one or more images, one or more image-location associations, and one or more image instructions for the portable display device 105. The image-location associations can associate one or more images with one or more geographic areas. The image instructions can comprise instructions or conditions for the display of one or more images on the digital displays 125 of the portable display device 105. For example, the image instructions can include one or more times at which to display one or more images, one or more time intervals in which to display one or more images, one or more geographic areas in which to display one or more images, and an order for which to display one or more images. The image instructions can also include a geographic route over which to display one or more images.

In some embodiments, the portable display device 105 is secured to a vehicle. The image instructions may comprise one or more vehicles, one or more vehicle models, one or more vehicle makes, one or more vehicle model years, one or more vehicle colors, one or more vehicle pricing values, one or more vehicle conditions, or any other vehicle distinguishing characteristic for a vehicle on which to display the one or more images. In some alternative embodiments, a portable display device is part of the vehicle.

Some embodiments comprise multiple portable display devices. The image instructions may comprise number of portable display devices on which to display the one or more images, distance between portable display devices on which to display the one or more images, and a selection of one or more portable display devices on which to display the one or more images.

If stored in an external device, image-related data, location data, and/or computed locations can be transmitted to the portable display device 105. In response to receiving one or more of the image related data, the location data, and the computed locations at the portable display device 105, the digital displays 125 can display one or more images.

The system 100 may also include one or more software applications allowing for the input or selection of image related data, including one or more images, image-location associations, and image instructions. In some embodiments, the software applications can be accessed on an external device such as the server 102, the mobile device 106, and the computing device 108. In some embodiments, the software applications can be accessed on the portable display device. Software applications may be accessed by one or more users including advertisers, drivers, information technology technicians, security personnel, emergency services personnel, advertisement sellers, portable display device retailers, or any other persons having an interest in the function of the portable display device 105.

In an alternative embodiment, the system 100 may comprise one or more location sensors 180 which is separate and apart from the portable display device 105. The one or more location sensors may be secured to the same surface as the portable display device. The one or more location sensors 180 can also be secured to the same object as the portable display device 105. In some embodiments, the location sensors may be secured to any section of a vehicle to which the portable display device is secured, on either the interior or exterior of the vehicle.

In some embodiments, the system 100 can comprise a location sensing system having one or more sensors secured to a portable display device or secured to the same object as the portable display device and one or more location sensors located at fixed geographic locations. The one or more location sensors may communicate with one or more of the other location sensors, the portable display device, and one or more external devices.

Figure 3:
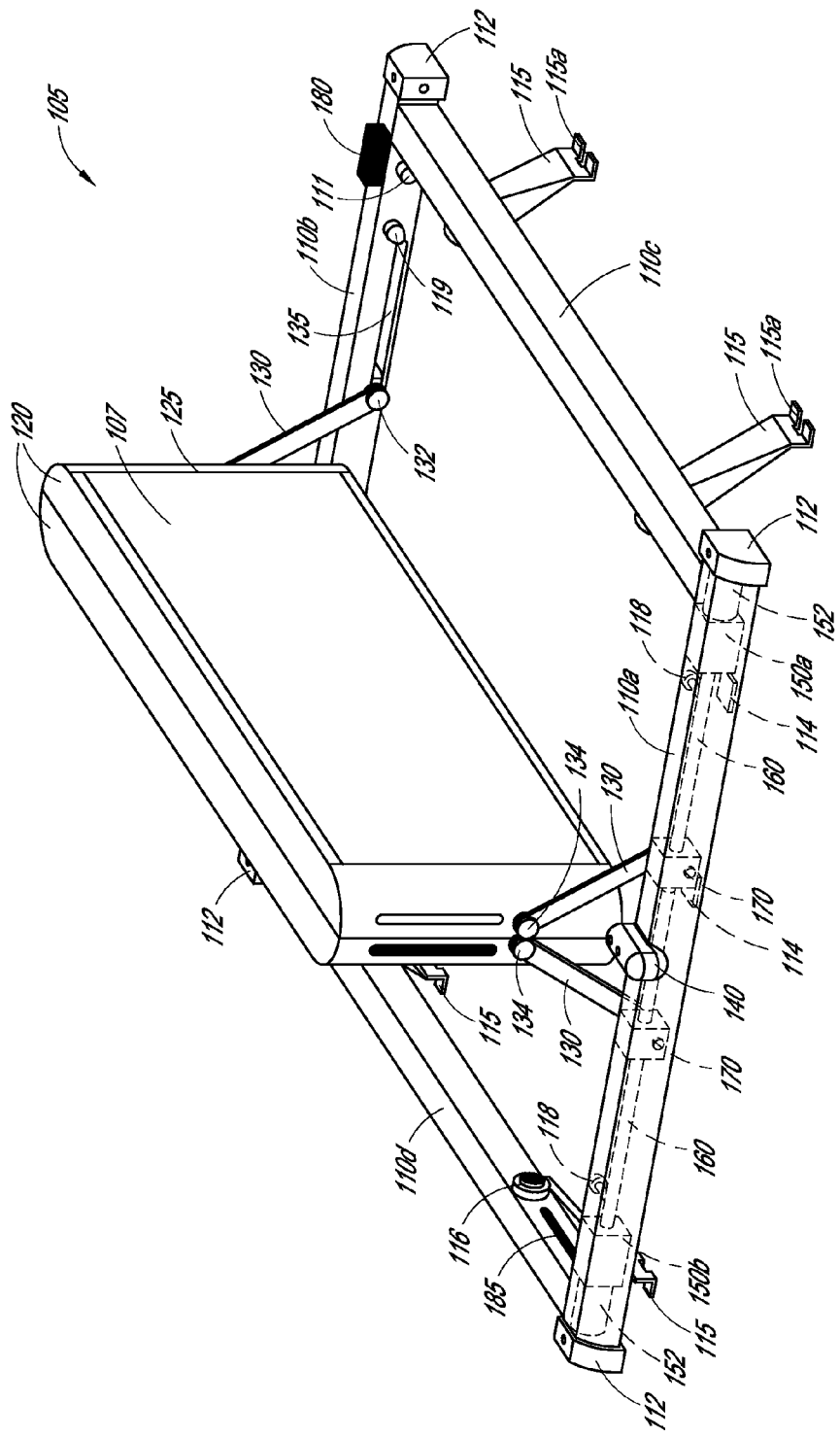
FIG. 3 is a perspective view of an illustrative embodiment of a portable display device in which internal features are shown in dashed lines.

FIG. 3 illustrates an exemplary embodiment of the portable display device 105. The portable display device 105 comprises four frame elements 110a-d, which connect to form a substantially rectangular frame. Frame elements 110a and 110b comprise hollow bars oriented in parallel to one another and configured to house a plurality of components of the portable display device 105. Frame elements 110c and 110d are oriented perpendicular to frame elements 110a and 110b and are secured to frame elements 110a and 110b near opposite ends in order to connect frame element 110a to frame element 110b so as to form the substantially rectangular frame. Frame elements 110c and 110d can be secured to frame elements 110a and 110b through any suitable means. For example, frame elements 110a and 110b can include threaded openings to interlock with threaded sections of frame elements 110c and 110b. Alternatively, frame elements 110a and 110b can be secured to frame elements 110c and 110b by one or more fasteners or by welding. The frame elements 110a-d can comprise metal, plastic, ceramic, polymer, or any other suitable material.

Extending from each of the frame elements 110c and 110d are two mounting bases 115. The mounting bases 115 are secured to the frame elements 110c and 110d by fasteners 116 and can provide structural support to the frame formed by frame elements 110a-d. The fasteners 116 can include one or more screws, bolts, rivets, or any other suitable fasteners. In some embodiments, the fastener 116 can include a sunken nut. Each mounting base 115 extends outwardly and downwardly from the frame element to which the mounting base 115 is secured. Each mounting base 115 also includes a support foot 115a at the end opposite to the point of attachment to the frame element. Each support foot 115a is oriented substantially in parallel with a plane defined by the frame formed by frame elements 110a-d and includes a slot for receiving a fastening element. When placed on the surface of an object such as a vehicle, the support foot can provide support to the frame formed by frame elements 110a-d. The slot of the support foot 115a is configured to receive a fastening element to secure the portable display device to a surface, such as a vehicle rack on the roof of a vehicle. In some embodiments, the support foot 115a can be secured to a surface using a sunken nut. The mounting bases 115 can be also configured for mounting of the portable display device 105 to any other vehicle surface or surface of a moving object. The mounting bases 115 can comprise metal, plastic, ceramic, polymer, or any other suitable material.

Secured to each end of the frame elements 110a and 110b is a cap 112. Each cap 112 can engage a frame element 110a and 110b through threading, the use of one or more fasteners, or any other suitable securing mechanism. The caps 112 cover exposed edges of the frame elements 110a and 110b. The caps 112 are also configured to engage one or more components positioned inside the frame elements 110 and 110b and can provide structural support to the components The caps 112 can comprise metal, plastic, ceramic, polymer, or any other suitable material.

Several components of the portable display device 105 can be housed in the interior of the frame elements 110a and 110b. Each of the frame elements 110a and 110b houses a pair of support rods 152, a pair of motors 150a and 150b, a drive shaft 160, and a pair of shaft connections 170. Each of the support rods 152 is secured on one end to one of the caps 112 and secured on the other end to one of the motors 150a and 150b. The caps 112 provide structural support to the support rods 152 which provide support to the motors 150a and 150b. Surfaces of the motors 150a and 150b may also contact interior surfaces of the frame elements 110a and 110b, which can provide further support for the motors 150a and 150b. The motors 150a and 150b are also secured to the frame elements 110a and 110b by fasteners 111. The support rods 152 can be secured to the caps 112 through threading, the use of one or more fasteners, or any other suitable securing mechanism. The motors 150a and 150b can be secured to the support rods 152 through threading, the use of one or more fasteners, or any other suitable securing mechanism.

The motors 150a and 150b engage a drive shaft 160, which extends from the motor 150a to the motor 150b. In some embodiments, motor 150b is instead a receiving member configured to receive a portion of the drive shaft 160 and to provide support for the drive shaft 160. The drive shaft 160 also extends through the shaft connections 170, which include through holes for receiving the drive shaft 160. At least portions of the drive shaft 160 are threaded. The through holes of the shaft connections 170 also contain threads that mate with the threads of the drive shaft 160. The motors 150a, and in some embodiments 150b, cause the axial rotation of the rod 160, which in turn causes the longitudinal movement of the shaft connections 170 along the interior of the frame elements 110a and 110b. Each motor 150 can comprise a driving electric motor, a DC motor, an AC motor, a linear motor, a rotating motor, a spindle motor, or any other suitable motor. The frame elements 110a and 110b further include micro-switches 114, which can regulate the flow of electricity to electrical components within the portable display device, such as the motors 150a and 150b. In some embodiments, at least a portion of the exterior of each shaft connection 170 abuts the interior of the frame elements 110a or 110b in which it is housed to prevent rotation of the shaft connection 170.

Each of the frame elements 110a and 110b further includes a pair of grooves 135 extending along a length of the frame elements 110a and 110b, Each shaft connection 170 can traverse over the length of one of the grooves 135. Each groove 135 provides access to the interior of one of the frame elements 110a and 110b. One end of an arm 130 is secured to each shaft connection 170 by a fastener 132 that extends through the arm 130, through the groove 135, and into the shaft connection 170. The other end of each arm 130 extends upward and is secured to one of a pair of wings 120 by a fastener 134. The fasteners 132 and fasteners 134 can be screw, bolts, rivets, or any other suitable fastener. Adjacent to the distal end of each groove 135 is a rubber stopper 118 including a fastening element for securing each rubber stopper component 118 to the frame element 110a or 110b and a rubber head 119. The rubber head 119 is configured to prevent the fastener 132 from damaging the sections of the frame elements 110a and 110b that form the outer boundaries of the grooves 135.

The pair of wings 120 are oriented so that the length of the wings 120 runs in parallel with the frame elements 110c and 110d. Each wing 120 is secured to one of the arms 130 secured to a shaft connection 170 in frame element 110a and one of the arms 130 secured to a shaft connection 170 in frame element 110b. The pair of wings 120 are connected by a hinge 145 (shown in FIGS. 4A-C) that extends from a hinge attachment 140 secured to the exterior of the frame element 110a to a hinge attachment 140 secured to the exterior of the frame element 110b.

The longitudinal movement of the shaft connections 170 through the interior of the frame elements 110a and 110b along the length of the groove 135 causes the movement of the arms 130. The movement of the arms 130 causes the rotation of the wings 120 about the hinge 145. The wings 120 can rotate throughout a range of positions. At one end of the range, the wings 120 are in an upright state, substantially perpendicular to a plane defined by the frame elements 110a-d. At the other end of the range, the wings 120 are in a retracted state, substantially parallel to the plane defined by the frame elements 110a-d. The movement of the wings 120 is further depicted in FIGS. 4A-D, discussed below. The hinge attachments 140 and hinge 145 can also provide support for the wings 120.

Each wing 120 comprises a housing for a digital display 125. Each digital display 125 can comprise the display screen 107, which can be a liquid-crystal display ("LCD") screen, a plasma display, a light-emitting diode ("LED") display, an electroluminescent display, or any other flat panel display, electronic visual display, or video display.

The portable display device 105 also includes the location sensor 180 secured to the exterior of the frame element 110b and the communication module 185 secured to the exterior of the frame element 110d. The location sensor 180 and communication module 185 are secured to the exterior of the frame elements to facilitate transmission and receipt of wireless signals. In alternative embodiments, the location sensor 180 and communication module 185 may be secured to any suitable surface on the exterior of the portable display device 105 or housed within the interior of any of the frame elements 110a-d.

In some embodiments, the motors 150a and 150b are activated in response to receiving a signal at the communication module 185. In some embodiments, the motors 150a and 150b are activated in response to receiving location data from the location sensor 180 or a location determination. The motors 150a and 150b can also be activated in response to instructions stored within the portable display device 105.

The location sensor 180 can include a GPS device, such as a GPS antenna or GPS receiver. The location sensor 180 can also include an RFID device. The location sensor 180 can include one or more RFID tags and/or RFID readers. The location sensor 180 can also include any satellite based location devices, local positioning system devices, or other suitable location determination or tracking devices.

The communication module 185 can include a Wi-Fi antenna, a Bluetooth device, a cellular device, or any other wireless communication interface. The communication module 185 can also include a USB port, a mini-USB port, a serial port, a parallel port, an HDMI port, or any other wired communication interface.

Figure 5:
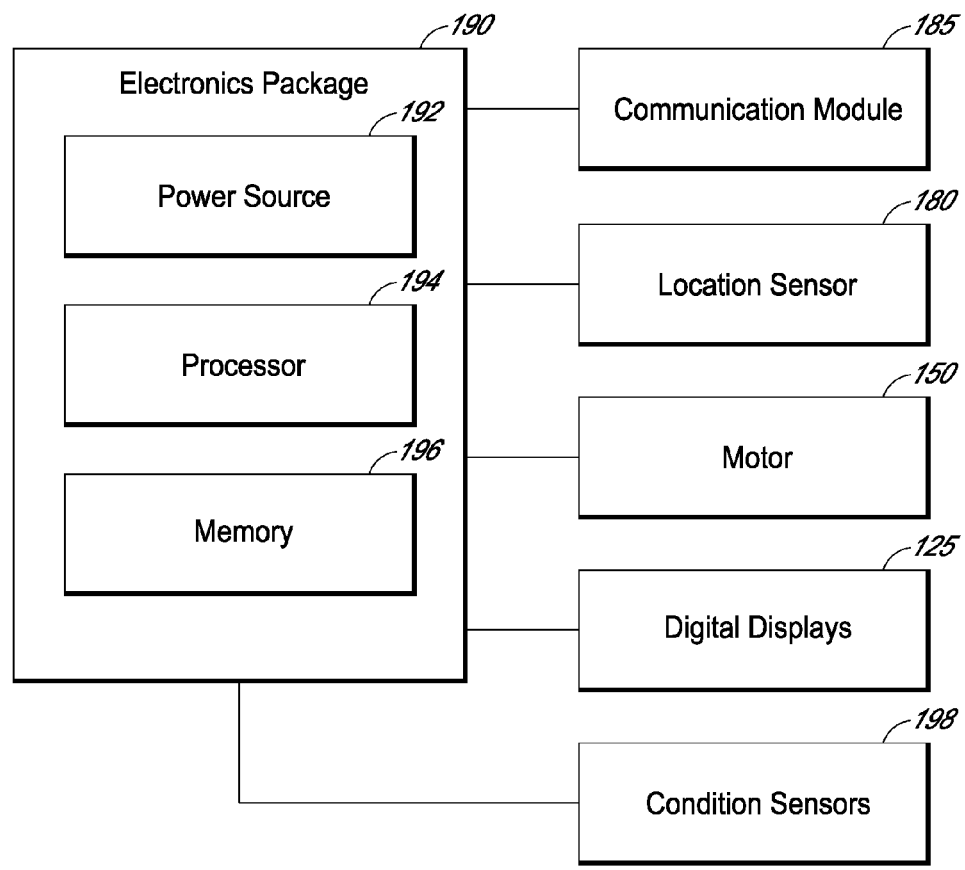
FIG. 5 is a schematic diagram illustrating components of an illustrative embodiment of a portable display device.

The portable display device 105 further includes one or more condition sensors 198 as described more fully with respect to FIG. 5. The condition sensors can be secured to the exterior of the frame elements 110a-d or FIG. 3, housed in the interior of the frame elements 110a-d, or secured to any other suitable surface on the portable display device 105. The condition sensors 198 can include one or more of an accelerometer, a temperature sensor, a gyroscope, a barometer, a motion sensor, a proximity sensor, a clock, and a timer.

Continuing to refer to FIG. 3, the digital displays 125 are configured to display one or more images. In some embodiments, the digital displays 125 can be configured to display one or more images in response to one or more of receiving data at the communication module 185, receiving location data or a location determination, and in response to instructions stored in the portable display device 105.

The portable display device 105 may also comprise a user interface (not shown). The user interface can comprise an input device and a display device. In some embodiments, the digital displays 125 comprise the display device for the user interface. In some embodiments, the user interface can comprise a keyboard, a touch screen, or any other suitable input device. In some embodiments, the input device engages the portable display device 105 through the communication module 180. The input device may also be mounted to the portable display device 105. Image related data or location data can be input into the user interface. Instructions for the motor 150 can also be input into the user interface.

The portable display device 105 can also include several security features. For example, the portable display device 105 can include one or more locks. The locks can be located on the mounting bases 115 and can secure the mounting bases to the surface of an object such as a vehicle rack. The portable display device 105 can also include one or more cameras, which can be mounted to one or more of the frame elements 110a-d or on one or more surfaces of the vehicle or object to which the portable display device 105 is secured. The portable display device 105 can also require a password before beginning one or more functions, such as changing configuration or displaying images. The password may be input into an external device, or into a user interface on the portable display device. The portable display device 105 may also be configured to deactivate or delete data in response to an indication of a security breach, such as a signal from an external device, activation of a vehicle alarm, or activation of an alarm on the portable display device 105. The communication module 185 may be configured to transmit location data to an external device in response to an indication of a security breach, such as a signal sent from an external device, activation of a vehicle alarm, or activation of an alarm on the portable display device 105. The portable display device 105 may further include a tracking system. The tracking system can include one or more tracking chips, such as, for example, a radio transceiver. Each tracking chip can be secured to an external surface of the portable display device 105, to the interior of frame elements 110*a-d*, or within the wings 120 or digital displays 125. Some embodiments may further include a covering component to hide the presence of the tracking chip. In some embodiments, a fastening element such as sunken nut can be used to secure the portable display device 105 to a surface or to secure one or more components of the portable display device 105 to other components of the portable display device 105. For example, each fastener 116 can include a sunken nut. The fastening element can be designed so that a special tool is required for removal.

In some embodiments, one or more components of the portable display device 105 can be water-proof or weather resistant.

The frame structure of a portable display device is not limited to the structure described above, but can include any structure capable of supporting a digital display and securing a digital display to a surface of an object such as a vehicle. For example, a portable display device can include any number of frame elements. In an alternative embodiment, a portable display device may include only two frame elements such as elements 110*a* and 110*b*, which can be secured to one or more mounting bases.

A portable display device can be secured to the surface of an object such as a vehicle using any securement structure known in the art, such as, for example, one or more suction pads.

Alternative embodiments can include any number of wings. In some embodiments, each wing houses a plurality of digital displays. For example, a digital display may be housed in each side of a wing, or a wing may house several digital displays on a single side.

In an alternative embodiment, a portable display device includes a transparent display screen. The transparent display screen can be a window for a vehicle. The transparent display screen can further include one or more location sensors, a communication module, one or more condition sensors, and a user interface. Alternatively, one or more of the location sensors, the communication module, the condition sensors, and the user interface can be secured to a vehicle or object to which the portable display device is secured in a separate location.

In another alternative embodiment, a portable display device includes a projector that projects an image onto a display. In one embodiment, the projector can project an image onto a window, such as the window of a vehicle.

In another alternative embodiment, a portable display device is secured to a side of a vehicle. The portable display device can comprise a digital display. The digital display may be mounted to the surface of the side of the vehicle or secured within a recess in the side of a vehicle. The portable display device can further include one or more concealing elements configured to slide or rotate so as to obscure at least a portion of the digital display. The position of the concealing elements can be controlled by a motor or adjusted manually. In some embodiments, the digital display is housed in a movable component secured to the side of a vehicle that can move through several configurations. In a first configuration, the digital display is visible from outside of the vehicle. In a second configuration, the digital display is at least partially obscured. The movable component may undergo rotational movement about a hinge secured to the vehicle. The movable component can be controlled by a motor or adjusted manually. The portable display device can further include one or more location sensors, a communication module, one or more condition sensors, and a user interface. Alternatively, the location sensors, the communication module, the condition sensors, and the user interface can be secured to the vehicle or object to which the portable display device 105 is secured in a separate location. In some embodiments, the digital display can be concealed by a color change of the digital display.

In an alternative embodiment, a portable display device may not have a digital or electronic display. The portable display device can have one or more wings that house a static image or sign, or that are capable of receiving a static image or sign. In some embodiments, a static image may be affixed directly to the surface of one or more of the wings.

In some embodiments, a portable display device may have audio capabilities. The portable display device can include one or more speakers such as, for example, loudspeakers or wireless speakers.

Figure 4A:
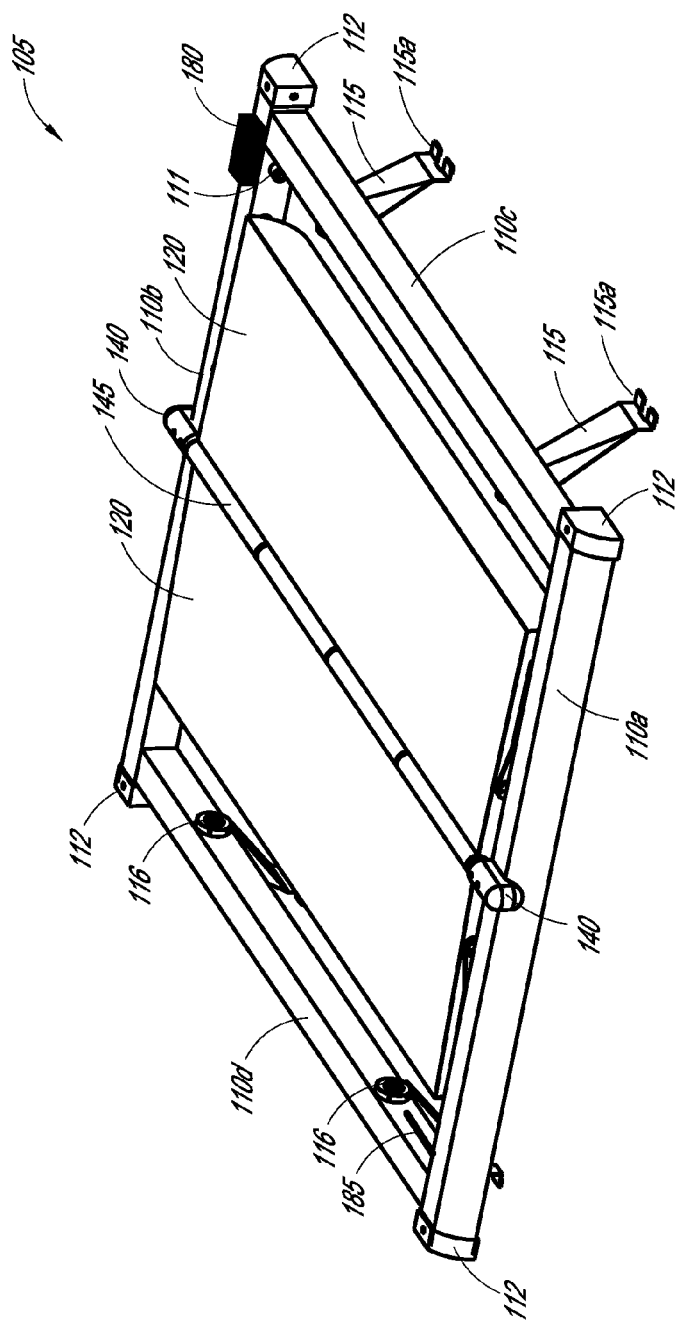
FIG. 4A is a perspective view of an illustrative embodiment of a portable display device in a first configuration.
Figure 4B:
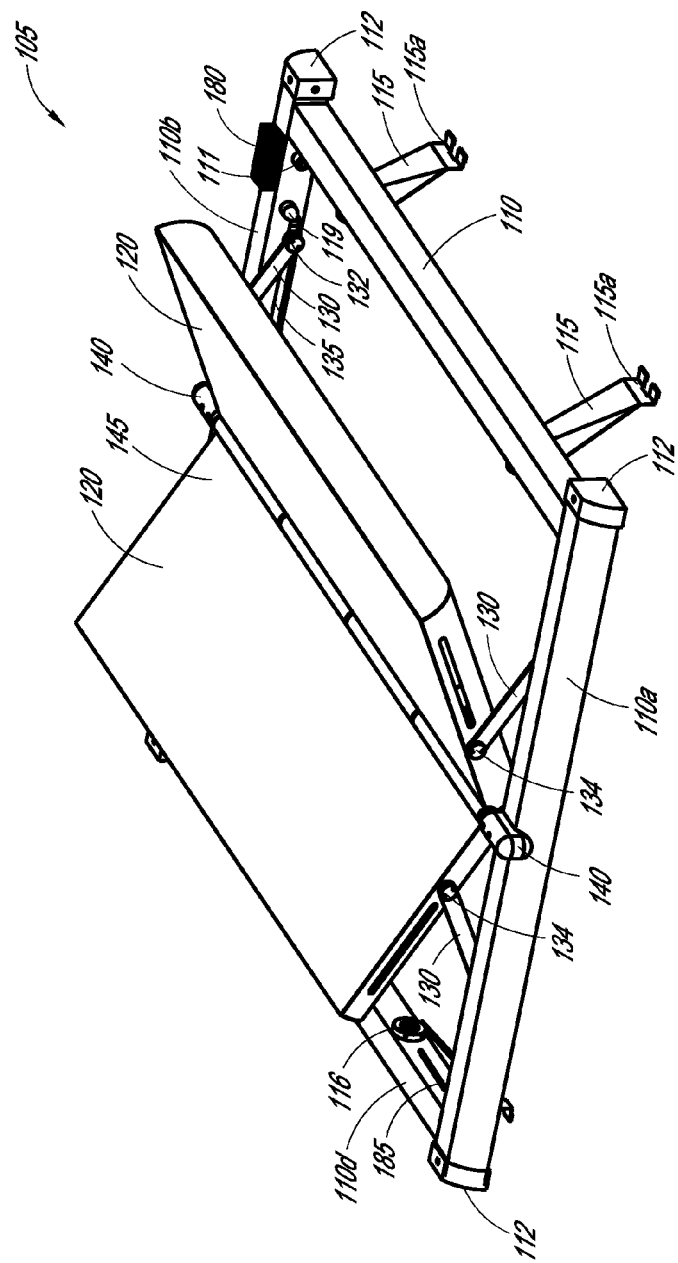
FIG. 4B is a perspective view of the device of FIG. 4A, shown in a second configuration.
Figure 4C:
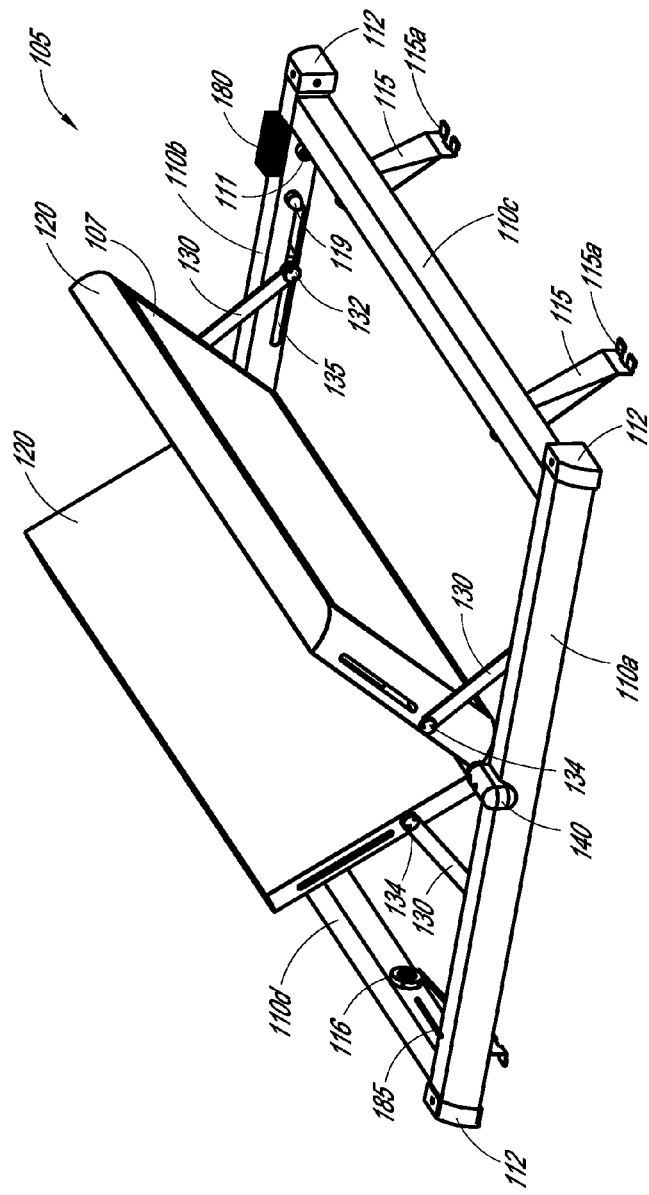
FIG. 4C is a perspective view of the device of FIG. 4A, shown in a third configuration.
Figure 4D:
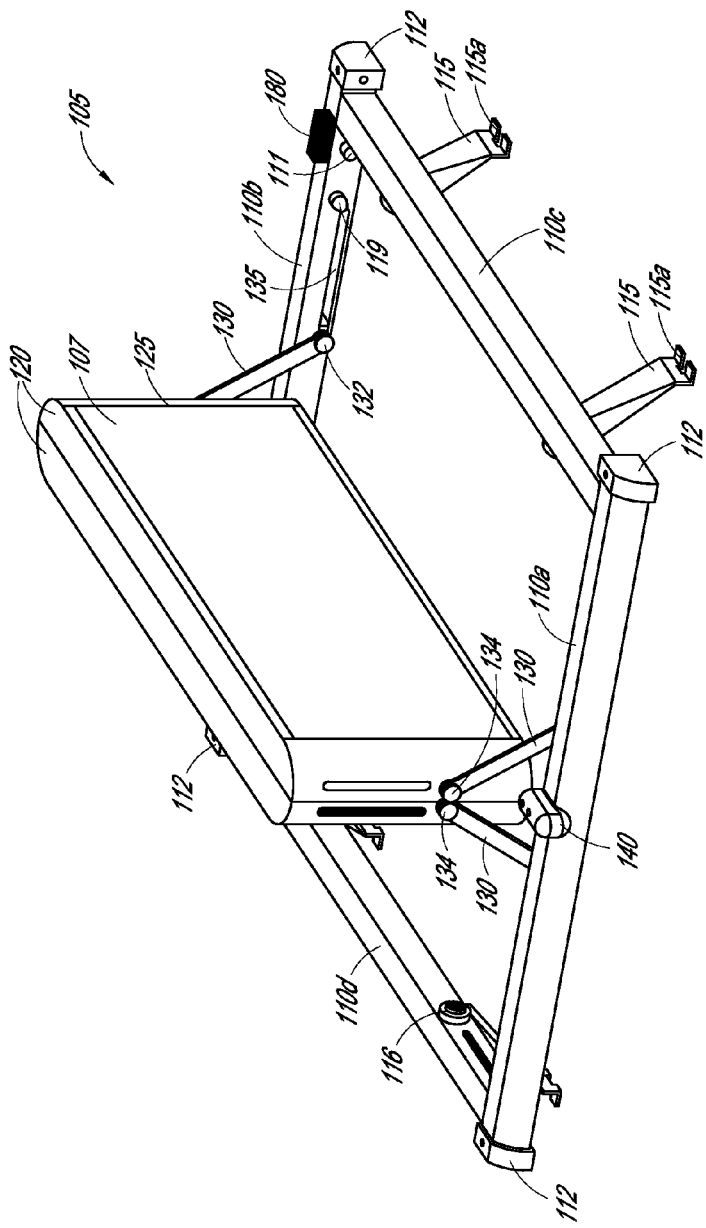
FIG. 4D is a perspective view of the device of FIG. 4A, shown in a fourth configuration.

FIGS. 4A-D illustrate the display device 105 in several configurations. In particular, FIGS. 4A-D show the shaft connection 170 in several different positions, from a retracted position to an upright position. Each movement of the shaft connections 170 correlates to movement of the arms 130 along the groove 135 and the rotational movement of the wings 120 about the hinge 145. FIG. 4A shows a first configuration in which the portable display device 105 is in the retracted position. In FIG. 4A, the wings 120 are substantially parallel to a plane defined by the frame elements 110*a-d*. In this configuration, each shaft connection 170 is positioned at its most distal position within the frame 110, causing the end of each arm 130 connected to the shaft connections 170 to be positioned at a distal end of the corresponding grove 135. In this configuration, the arms 130 extend slightly upward from the point of connection to the shaft connection 170 to the point of connection to the wings 120. FIGS. 4B and 4C show a second and a third configuration, respectively, wherein each shaft connection 170 is positioned in between its most distal position within the frame 110 and its most proximal position within the frame 110, causing the end of each arm 130 connected to each shaft connection 170 to be positioned between the distal and proximal ends of the corresponding groove 135. The movement of each shaft connection 170 towards the proximal end of the grooves 135 causes the arms 130 to exert a pushing force on the wings 120 so that the wings 120 rotate about the hinge 145. FIGS. 4B and 4C show the position of the wings 120 as the shaft connection 170 moves between its most distal position and its most proximal position within the frame 110. FIG. 4D shows a fourth configuration in which the portable display device 105 is in the upright position. In FIG. 4D, the wings 120 are substantially perpendicular to the frame 110. In this configuration, each shaft connection 170 is positioned at its most proximal position within the frame 110, causing the end of each arm 130 connected to the shaft connections 170 to be positioned at a proximal end of the corresponding groove 135. Although the change in configuration is described from FIG. 4A to FIG. 4D, it should be recognized that the portable display device can also adjust from the configuration shown in FIG. 4D to the configuration shown in FIG. 4A, or to an intermediate position, or from one intermediate position to another intermediate position. When the configuration of the portable display device 105 changes from the configuration shown in FIG. 4D to FIG. 4A, the wings 120 rotate in response to a pulling force exerted by the arms 130.

In FIGS. 4A-D, the wings 120 undergo a rotational movement around an axis oriented in the center of portable display device 105. It should be recognized that the portable display device 105 can be configured in a plurality of configurations and can undergo a plurality of different movements allowing the portable display device to transition between an upright configuration and a retracted configuration. In one embodiment, the portable display device 105 may be configured so that one or more of the wings 120 are positioned near the periphery of the portable display device 105 when in the upright position. In such an embodiment, the wings 120 can be configured to rotate outward towards the periphery of the portable display device 105. In some embodiments, the wings 120 are engaged to one or more gears wherein the one or more gears are controlled by one or more motors. In such embodiments, the movement of the gears can cause the movement of the wings 120. In alternative embodiments, the wings 120 may undergo one or more linear movements.

FIG. 5 is a schematic diagram illustrating components of the portable display device 105. The portable display device 105 includes an electronics package 190. The electronics package 190 can communicate with the communication module 185, the location sensor 180, the motors 150a and 150b, the digital displays 125, and the condition sensors 198. The electronics package 190 further includes a power source 192, a processor 194, and a memory 196.

The power source 192 can include one or more batteries, one or more solar panels, one or more connections for external power, or any other suitable power source. In one embodiment, the portable display device 105 can be configured to receive power from a vehicle. The power source 192 can be configured to receive power from an external source through a wired connection or by wireless power transfer.

The memory 196 is configured to store data. The memory 196 can store instructions for the processor 194. The memory 196 can also store image related data, location data, or computed locations. The image related data can include one or more images, one or more image-location associations, and one or more image instructions for the portable display device 105. The memory 196 may store at least some data prior to use of the portable display device 105. The memory 196 can also be configured to store data received from one or more of an external device through the communication module 185, the location sensor 180, the condition sensors 198, and a user interface on the portable display device 105.

The communication module 185 can connect to an external device through any wired or wireless connection. The communication module 185 can comprise a USB port, a mini-USB port, a serial port, a parallel port, an HDMI port, or any other wired communication interface. The communication module 185 can also communicate with an external device through wireless communication using cellular communication, Wi-Fi, Bluetooth, GSM or any other wireless communication protocol. The communication module 185 can comprise a Wi-Fi antenna, or any other wireless communication interface. The communication module 185 can be configured to communicate with external devices including, but not limited to, a mobile device, a computing device, a server, or a data storage device such as a USB flash drive.

The location sensor 180 detects location data for the digital display device 105. The location sensor 180 can comprise a global positioning system ("GPS") device. The GPS device can comprise a GPS receiver. The GPS receiver can communicate with GPS satellites to receive location data. In some embodiments, the GPS device comprises a GPS antenna. The location sensor 180 may also comprise an RFID tag or RFID reader. In one embodiment, the location sensor 180 may comprise a passive RFID reader that receives signals from active RFID tags. The active RFID tags can be located at specific geographic locations. For example, the RFID tags may be secured to one or more buildings or other structures. In another embodiment, the location sensor 180 may comprise an active RFID reader that transmits signals to and receives signals from active or passive RFID tags. The RFID tags can be located at specific geographic locations. For example, the RFID tags may be secured to one or more buildings or other structures. The location sensor 180 can also comprise one or more active or passive RFID tags capable of communicating with one or more RFID readers. The RFID readers can be located at specific geographic locations. For example, the RFID tags may be secured to one or more buildings or other structures. The location sensor 180 can also comprise any satellite based location devices, local positioning system devices, or other suitable location determination or tracking devices.

The location sensor 180 can also include a communication module configured to transmit location data or a computed location to one or more of the processor 194, the memory 196, the communication module 185, or one or more external devices. In some embodiments, the communication module 185 can transmit location data to one or more external devices.

The location sensor 180 can also comprise location software, wherein the software can compute a location of the location sensor 180 or portable display device 105. In some embodiments, the processor 194 can be configured to compute the location of the location sensor 180 or portable display device 105. In some embodiments, an external device such as a server, a mobile device, or a computing device can compute the location of the location sensor 180 or portable display device 105.

Some embodiments may include one or more location sensors separate and apart from the portable display device 105. The one or more location sensors may be secured to the same surface as the portable display device. The one or more location sensors can also be secured to the same object as the portable display device. In some embodiments, the location sensors may be secured to any section of a vehicle to which the portable display device is secured, on either the interior or exterior of the vehicle. One or more of the location sensors can communicate with the portable display device 105 through wired or wireless communication.

Some embodiments may include a location sensing system that can include one or more location sensors 180 secured to a portable display device 105, one or more location sensors secured to the same object as the portable display device 105, and one or more location sensors located at fixed geographic locations. The location sensors may communicate with other location sensors in the location sensing system, the portable display device 105, or one or more external devices. Components of the location sensing system can communicate with the portable display device 105 through wired or wireless communication.

The location of the portable display device 105 may be computed using any method known in the art. For example, the location can be calculated based at least in part on signals received from a plurality of GPS satellites at a location sensor 180. In one embodiment, the GPS satellites send a signal including a time of transmission and a location of the satellite. The time of transmission and location of the satellite as well as the time of arrival of the signal can be used to compute a geographic location. The location can also be computed using signal triangulation, trilateration, or multilateration. In some embodiments, the location sensors can receive signals from a plurality of radio towers and the location can be computed using one or more of triangulation, trilateration or multilateration. In one embodiment, the location can be computed using GSM localization. The location can be computed using software stored within the location sensor 180, the portable display device 105, or on an external device to which the location data is transmitted.

The condition sensors 198 are configured to detect data related to the condition of the portable display device 105. The condition sensors 198 can include one or more of an accelerometer, a temperature sensor, a gyroscope, a barometer, a motion sensor, a proximity sensor, a clock, and a timer. The proximity sensor can allow for the detection of obstacles in the path of the portable display device 105. The proximity sensor can include an ultrasonic sensor, a laser sensor, or a photoelectric sensor.

The processor 194 can be configured to control the motor 150. The processor 194 may be configured to cause the motor 150 to actuate in response to a signal received from an external device, location data detected at the location sensor 180, a location computed by one or more of the location sensor 180, the processor 194, and one or more external devices, or in response to programmed instructions stored in the memory 196. For example, the processor 194 can be configured to cause the motor 150 to actuate at a particular time or after a particular time interval. The processor 194 can be configured to cause the motor 150 to actuate in response to a location determination. The processor 194 can also be configured to cause the motor 150 to actuate in response to the starting or turning off of a vehicle. The processor 194 can also be configured to cause the motor 150 to actuate in response to the detection of an object in the path of the portable display device 105 by one or the sensors 198.

In some embodiments, the portable display device 105 can be configured to send a transmission to an external device prompting a user to verify actuation of the motor 150. The portable display device 105 can be programmed to actuate the motor in response to a selection received from the external device in response to prompting a user to verify actuation of the motor 150.

The processor 194 can also be configured to control the content of the digital displays 125. The processor 194 can be configured to cause the digital displays 125 to display a particular image or series of images based on a computed location, data received from an external device, or programmed instructions stored in the memory 196. For example, the processor 194 may be configured to cause one or more images to be displayed on the digital displays 125 at a particular time, at particular time intervals, or in response to a distance traveled. The processor 194 may also be configured to cause one or more images to be displayed on the digital displays 125 in response to the starting of a vehicle.

Figure 6:
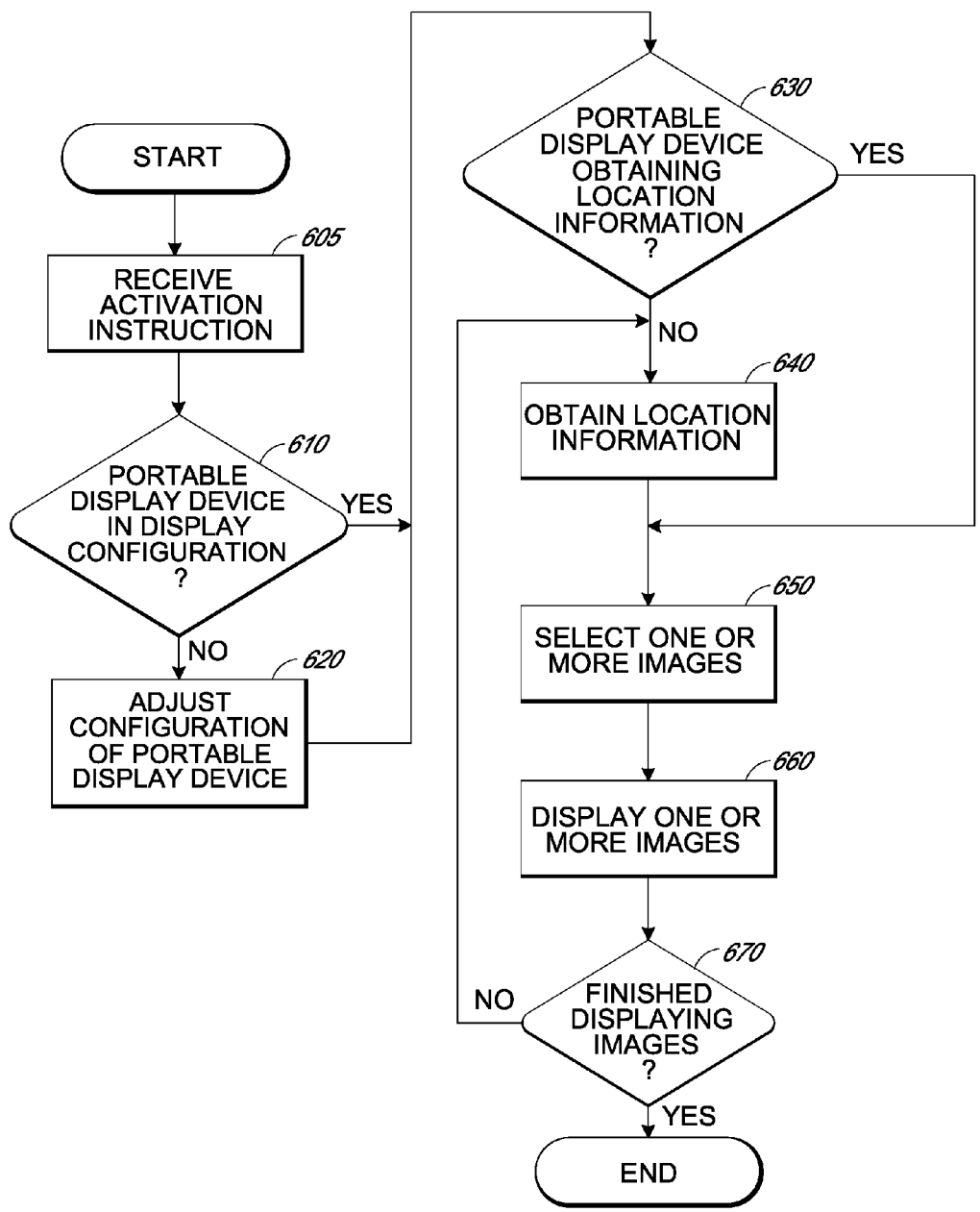
FIG. 6 is a flowchart of an illustrative embodiment of a process for selecting and displaying one or more images on a portable display device.

FIG. 6 depicts a flowchart of a process 600 of an illustrative embodiment of selecting and displaying one or more images on a portable display device. The process begins at a step 610, wherein an activation signal or instruction is received by a portable display device, such as portable display device 105.

In some embodiments, the portable display device 105 may be activated in response to receiving a signal from one or more external devices, such as a server, a mobile device, or a computing device. In some embodiments, the portable display device 105 can include a user interface, and can be activated in response to a selection or input on the user interface. The portable display device 105 can also include one or more buttons or triggers. The portable display device 105 can be activated by engagement of the buttons or triggers.

In some embodiments, the portable display device 105 is activated in response to the presence of the portable display device 105 in a particular geographic location. Data related to the geographic location of the portable display device may be detected by one or more location sensors, such as location sensor 180.

In some embodiments, the portable display device 105 is activated in response to one or more conditions detected by one or more condition sensors, such as condition sensors 198. For example, the condition sensors 198 can comprise one or more of a clock and a timer. The portable display device 105 can be configured to activate at a particular time or after a particular time interval. The condition sensors 198 may also comprise a proximity sensor, which can allow for the detection of obstacles in the path of the portable display device. The portable display device 105 can be configured to activate in response to a determination by the proximity sensor that no obstacles are detected in the path of the portable display device.

In some embodiments wherein the portable display device 105 is secured to a vehicle, the portable display device can be activated by the starting of the vehicle. In some embodiments, the portable display device is configured to activate following a defined time interval after the vehicle is activated. The time interval may be programmable or adjustable.

After an activation signal or instruction is received, the process 600 moves to a decision step 610, wherein, a decision is made whether the portable display device 105 is in a configuration to display images, such as the upright configuration shown in FIG. 4D. If a decision is made that the portable display device 105 is not in configuration to display images, the process 600 moves to step 620, wherein the configuration of the portable display device 105 is adjusted so that the portable display device 105 is in position to display images. The configuration can be adjusted by activating the motors 150a and 150b to cause the rotation of the wings 120 of the portable display device 105 as described above with reference to FIGS. 3 and 4.

If a determination is made at step 610 that the portable display device 105 is in a configuration to display images, or after the configuration of the portable display device 105 is adjusted at step 620, the process 600 moves to a decision step 630, wherein a determination is made whether the portable display device 105 is obtaining location information.

If a determination is made that the portable display device 105 is not obtaining location information, the process 600 moves to a step 640 where the portable display device 105 obtains location information. The portable display device 105 can obtain location information from the location sensor 180, the processor 194, or one or more externals devices.

If a determination is made at step 630 that the portable display device 105 is obtaining location information, or after obtaining location information at step 640, the process moves to step 650, wherein one or more images are selected. The images are selected based on the location information obtained in step 640. One or more images can be associated with one or more geographic areas. Image-location association data can be stored in the memory 196 of the portable display device 105 or on an external device, such as a mobile device, a computing device, or a server. After location information is obtained, one or more images are selected that are associated with the geographic area associated with the location information. The selected images can be stored in the memory 196 of the portable display device 105 or on an external device such as a mobile device, a computing device, or a server.

After one or more images are selected, the process 600 moves to a step 660, wherein the portable display device 105 begins displaying the selected images on the one or more digital displays 125 of a portable display device 105. In some embodiments, the selected images can be transmitted to the portable display device 105 from an external device such as a server, computing device or mobile device. In some embodiments, the one or more images can be stored in the memory 196 of the portable display device 105. Instructions for displaying images can also be stored in the memory 196 of the portable display device 105 or on an external device such as a mobile device, a computing device, or a server. One or more of the images and instructions can be transmitted to the portable display device 105 from an external device. A processor in the portable display device 105, such as processor 194 can be configured to control the digital displays 125 to display the selected images according to the instructions. Instructions can include, for example, an amount of time to display each selected image or set of selected images, or a distance traveled over which to display each selected image or set of selected images.

After the portable display device begins displaying the selected images, the process moves to a decision step 670, wherein a determination is made whether the portable display device 105 is finished displaying images. The portable display device 105 may terminate displaying based on receiving a signal transmitted from an external device such as a server, a mobile device, or a computing device. The signal can be transmitted from the external device in response to a selection or input by a user. In some embodiments, the signal can be transmitted in response to the activation of an override switch. The override switch can be located on the interior or exterior of a vehicle or can be a feature of a software application on an external device. The portable display device 105 may also stop displaying images based on a selection or input into a user interface on the portable display device 105 or in response to the engagement of a button or trigger on the portable display device 105. The portable display device 105 may also stop displaying images based on an obtained location.

The portable display device 105 may also stop displaying images based on a change in the configuration of the portable display device 105. In some embodiments, the portable display device 105 may stop displaying images when in a position where the digital displays are no longer visible such as, for example, if the portable display device 105 retracts to the configuration shown in FIG. 4A.

The portable display device 105 may also terminate display of images based on detection of one or more conditions affecting the function of the portable display device 105. For example, the portable display device 105 may terminate display of images in response to the detection of an obstruction in the path of the portable display device 105. An obstruction may be detected by the condition sensors 198 on the portable display device 105 or by one or more sensors on the vehicle or object to which the portable display device 105 is secured. The portable display device 105 may also terminate display of images in response to temperature, humidity, or other weather conditions like rain, snow, or hail. The portable display device 105 may also terminate display of images in response to the amount of power left in a power source 192 of the portable display device 105. The portable display device 105 may terminate display of images in response to the vehicle turning off.

If the portable display device 105 is not finished displaying images, the process 600 returns to step 630, and proceeds as described above.

If a determination is made in step 670 that the portable display device is finished displaying images, the process 600 concludes. In some embodiments, in step 670, the portable display device 105 adjusts to a retracted configuration, such as the configuration shown in FIG. 4A, in response to the termination of display of images. In other embodiments, the portable display device 105 does not adjust to a different configuration in response to the termination of display of images, but instead adjusts to a retracted configuration in response to one or more instructions or events. For example, the portable display device 105 can adjust to a retracted position in response to receiving a signal from one or more external devices or in response to the activation of an override switch. When the portable display device 105 is secured to a vehicle, the portable display device 105 may adjust to a retracted position in response to the vehicle turning off. The portable display device 105 can also adjust to a retracted position in response to one or more conditions detected by the condition sensors 198. For example, the portable display device 105 may adjust to a retracted configuration in response to the detection of an obstruction in the path of the portable display device 105. The portable display device 105 may also adjust to a retracted configuration in response to temperature, humidity, or other weather conditions like rain, snow, or hail.

In some embodiments, when the portable display device 105 is inactive, several components of the portable display device 105 may cease operation in order to conserve power, such as location sensor 180, digital displays 125, processor 194, condition sensors 198, and a user interface.

In an alternative embodiment of a process for selecting and displaying images, after receiving activation instructions, the process can further include determining if one or more conditions are acceptable for activating the portable display device 105 based on data obtained by the condition sensors 198. For example, activation can be prevented if obstacles are detected in the path of the portable display device 105 or activation can be delayed until no obstacles are detected in the path of the portable display device 105. For example, in embodiments where the portable display device 105 is mounted to the roof of a vehicle, the condition sensors 198 may detect an obstruction such as a garage roof in the path of the portable display device 105. The condition sensors 198 may detect an obstruction blocking the adjustment of the portable display device 105 to one or more configuration of the portable display device 105. The condition sensors 198 may also detect an obstruction in the path of the portable display device 105 based on the direction that the vehicle or object to which the portable display device 105 is secured is moving.

In another alternative embodiment, the portable display device 105 may prompt for verification that the portable display device 105 should be activated. For example, the portable display device 105 may prompt for verification that the device should be activated after the starting of a vehicle, after the detection of a particular geographic location, at a predetermined time, after a particular time interval, or in response to one or more detections from the condition sensors 198. A user may be prompted to verify that activation should occur through a user interface on the portable display device 105 or through a signal transmitted to an external device. The user can verify that activation should occur by inputting or selecting a response on an external device, inputting or selecting a response on the user interface of the portable display device 105, or engaging a button or trigger on the portable display device 105.

In some alternative embodiments, images can be associated with one or more other conditions as well as, or instead of, geographic location. The portable display device 105 can be configured to select images based on one or more conditions or instructions. For example, a portable display device 105 may be configured to select one or more images based on one or more time conditions, such as a particular time, a particular time interval, a particular date, or a particular range of dates. In such an embodiment, after the portable display device 105 is in a configuration to display images, one or more images can be selected that are associated with the time conditions. The selected images can be displayed for a predetermined period of time, until the time conditions no longer apply, or in response to some other termination instruction or event. The portable display device 105 can also be configured to select images based on weather conditions. In some embodiments in which images are selected based on one or more conditions, the portable display device 105 will not obtain location information. In other embodiments, the portable display device can be configured to select images based on geographic location and one or more other conditions associated with the images.

In some embodiments, the portable display device 105 can be configured to display one or more images stored in the memory 196 or on an external device in communication with the portable display device 105 in a random order or in a predefined order regardless of location information or other condition information. In some embodiments, in response to activation of the portable display device 105, the portable display device 105 displays in series each image stored in the memory 196. As described above, the images can be transmitted to the memory 196 through wired or wireless communication. The portable display device 105 can begin displaying images based on a signal received from an external device, in response to a selection on a user interface of the portable display device, in response to the engagement of a button or trigger on the portable display device. In some embodiments, the portable display device can be configured to display images in response to the starting of a vehicle to which the portable display device is secured.

In some embodiments, a user can select one or more images to display in real time using an external device or a user interface on the portable display device 105. In some embodiments, a user can override an image selected based on location or one or more other conditions.

The display of images on the portable display device 105 can be further controlled by a plurality of other conditions or instructions apart from the selection of which images to display. The conditions and instructions are described in detail below.

Figure 7:
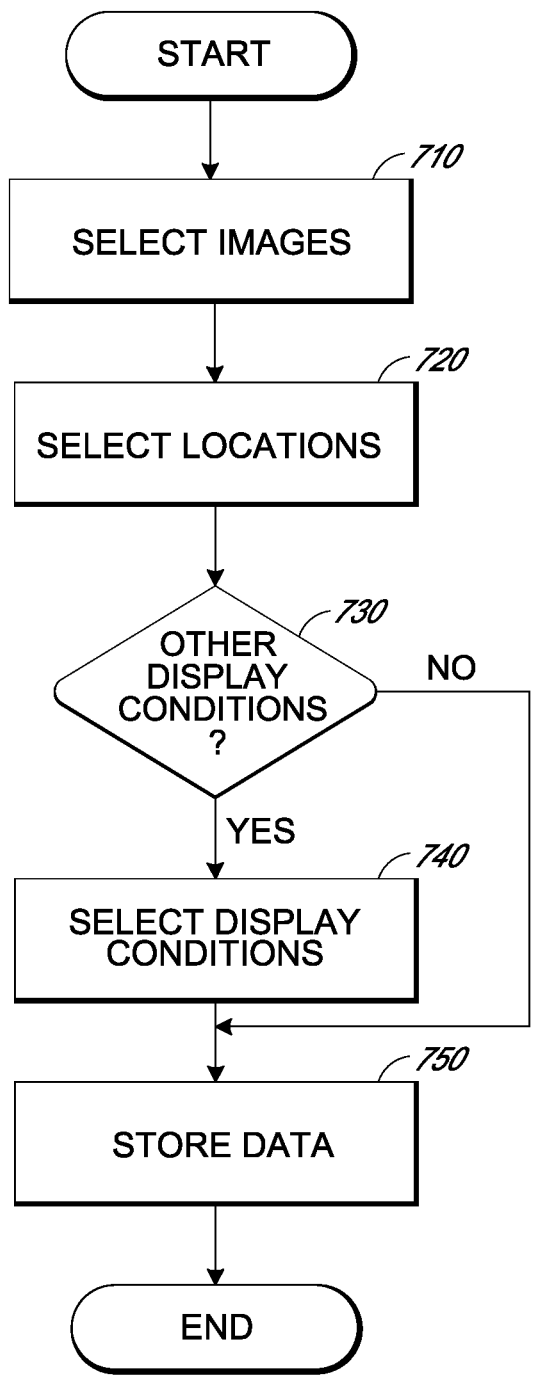
FIG. 7 is a flowchart of an illustrative embodiment of a process for providing instructions to a portable display device.

FIG. 7 depicts a flowchart of an exemplary process 700 for providing instructions to a portable display device 105. The process 700 begins at a step 710, wherein one or more images are selected or input. The one or more images can be selected or input using an external device such as a mobile device or computing device. In some embodiments, a software application is provided for inputting or selecting data for one or more portable display device 105. The software application can comprise a web-based interface. One or more images can be input or uploaded into the software application. The one or more images can then be selected for display on the portable display device 105. In some embodiments, image editing software is provided to create, modify, or edit images to be displayed on the portable display device.

After the one or more images are selected, the process 700 moves to a step 720, wherein one or more locations are selected. One or more geographic areas may be selected to be associated with one or more of the images selected in step 710. The selected geographic area can comprise a radius, one or more streets, one or more intersections, or one or more coordinates. In some embodiments, the software application provides a map over which a geographic area can be drawn or selected in any possible shape. In some embodiments, selecting one or more locations is performed using geo-fencing software. In some embodiments, a particular geographic route over which a portable display device 105 is to travel can be selected.

After the one or more locations are selected, the process 700 moves to a decision step 730, wherein a decision is made whether other conditions will be selected for the display of images on the portable display device 105. The decision may be performed using the software application.

If a decision is made at step 730 that one or more other conditions will be selected for the display of images on the portable display device 105, the process 700 moves to a step 740 wherein those one or more conditions are selected or input. The one or more conditions can be selected or input into an external device. The one or more conditions can be selected or input using the software application. The conditions can include, for example, one or more times of the day at which one or more images are to be displayed, one or more days of the week or dates on which one or more images are to be displayed, a number of times that a particular image or set of images is to be displayed in a period of time, such as a day or week, one or more lengths of time over which a particular image or set of images is to be displayed each time the particular image or set of images is displayed can be selected, a total length of time a particular image or set of images is to be displayed throughout a period of time, such as a day or a week, one or more time intervals between times displaying a particular image or set of images, and an order in which images are to be displayed.

Some embodiments may include multiple portable display devices 105. In those embodiments having multiple portable display devices 105, a minimum or maximum number of portable display devices 105 upon which an image or set of images is to be displayed can be selected in step 740. A minimum or maximum distance between portable display devices 105 upon which an image or set of images is to be displayed can be selected. A minimum or maximum time interval between displaying a particular image or set of images on different portable display devices 105 can also be selected.

In some embodiments, a user may pay to display images on one or more portable display devices 105. A user may pay based on a variety of conditions for displaying the images. In some embodiments, a minimum or maximum amount of money to spend on displaying a particular image or set of images can be selected. A minimum or maximum amount of money to spend on displaying a particular image or set of images in a defined period of time can also be selected.

In some embodiments, the portable display device 105 is secured to a vehicle. One or more conditions related to the vehicle can also be selected in step 740. For example, a selection can be made of one or more vehicles, one or more vehicle models, one or more vehicle makes, one or more vehicle model years, one or more vehicle colors, one or more vehicle pricing values, one or more vehicle state of repair statuses, one or more vehicle fitness for use statuses, or any other vehicle distinguishing characteristic for a vehicle on which to display the one or more images. In some embodiments, one or more conditions for a driver of the vehicle can be selected in step 740. One or more conditions may be based on driving experience of a driver. For example, a selection can be made of a minimum amount of time or between several ranges of amounts of time of driving experience, a minimum amount of time or between several ranges of amounts of time of driving experience with a portable display device 105, a minimum distance or several ranges of distances of driving experience. A selection may also be made of a maximum number of driving infractions or from several ranges of amounts of driving infractions. In some instances, drivers may be rated on one or more rating systems. A selection may be made of a minimum rating or between several ranges of ratings of the driver.

After other display conditions are selected or if a decision is made at step 730 that no other display conditions are to be selected, the process 700 moves to a step 750 wherein the data input or selected in steps 710, 720, and 740 is stored for use. In some embodiments, the data is stored on an external device on which the data is selected. In some embodiments, the data is transmitted from the device on which the data was selected or input, such as an external device or the portable display device 105, to an external device such as a server for storage. The data may be stored in a database. The data can be stored using cloud storage. In some embodiments, the data is transmitted from an external device to the portable display device 105 for storage in the memory 196. In some embodiments, wherein the data is selected or input into the portable display device 105, the data is stored in the memory 196. The stored data can be accessed in a process for selecting and displaying images, such as process 600 depicted in FIG. 6.

In some of the embodiments described above with respect to FIGS. 1-7, the portable display device can include software for tracking data related to the images displayed on the portable display device 105. The data can include the number of times an image or set of images is displayed, the length of time over which an image or set of images is displayed, the geographic locations at which an image or set of images is displayed, distance traveled over which an image or set of images is displayed, and the time at which an image or set of images is displayed. The software can also track data related to the amount of time the portable display device 105 is displaying images, the amount of time the portable display device 105 is not displaying images, the total distance traveled by the vehicle in a time period, the distance traveled while the portable display device 105 is displaying images in a time period, and the distance traveled while the portable display device 105 is not displaying images in a time period. The data can be transmitted to an external device through a communication module 185 of the portable display device 105.

In some embodiments an image or set of images can comprise an advertisement. The data tracked can be used to generate a bill for an advertiser. A bill can be based on cost conditions such as on the number of times an ad is displayed, the geographic location at which an ad is displayed, the time at which an ad is displayed, the length of time at which an ad is displayed, the type of vehicle or object upon which the ad is displayed, and the type of ads to be displayed on the portable display device 105. For example, a billing fee or rate may be higher for an advertisement on a portable display device 105 mounted to an expensive or luxury vehicle than for an advertisement on a portable display device 105 mounted to a standard vehicle. A billing fee or rate may be higher during certain hours where more a larger portion of the population is likely to see an advertisement, such as during periods of heavy traffic. A billing fee or rate may be higher for advertising in a more highly populated area, such as a city center, in comparison to a less populated area. A billing fee or rate may be higher for advertising in an area with a higher average income or where people with higher incomes are more likely to be found. A billing fee or rate may also be higher based on how many other advertisers would like an advertisement to appear at the same time. A billing fee or rate may also be higher based on the other ads that appear on the portable display device 105. For example, some portable display devices may display only ads for luxury goods. In some embodiments, advertisers be required to contract for one or more of a minimum amount of time displaying advertisements, a minimum time period over which advertisements will be displayed, a minimum number of times to display advertisements, or a minimum amount to spend on advertisements. In some embodiments, discounts may be offered for deposits or prepayments.

In some embodiments, an intermediary will perform one or more of maintaining a software application for advertisers to select images, locations, and other conditions for the display of images on a portable display device 105, maintaining a network of portable display devices 105, billing advertisers for advertisements on portable display devices 105, installing the portable display devices 105, maintaining the portable display devices 105, installing location sensors outside of the objects to which the portable display devices 105 are attached, facilitating communication between external devices and the portable display devices 105, transmitting data to the portable display devices, and managing drivers of vehicles to which the portable display devices 105 are secured. In some embodiments, the drivers can be employees of the companies for which advertisements are being displayed on the portable display devices 105. In some embodiments, the drivers can be drivers of personal vehicles that can decide when they would like the portable display device to display images or be in a particular configuration.

Drivers may receive a base fee or salary for having a portable display device 105 secured to a vehicle. Drivers may receive additional compensation based on one or more of the distance driven while displaying images on the portable display device 105, the amount of time displaying images on the portable display device 105, the average amount of time displaying images in a time period, the average amount of miles driven while displaying images in a time period, the type of vehicle to which the portable display device 105 is secured, experience of the driver in terms of amount of time driven or miles driven, the experience of the driver in terms of amount of time driven or miles driven with a portable display device 105 displaying images, or rating of the driver using one or more ratings systems. Drivers may also receive additional compensation for driving in particular areas, such as high traffic areas or areas where consumers are likely to be found, or for driving at particular times where consumers are more likely to be present. Additional compensation may be in the form of flat fees or higher rates. In some embodiments, drivers may be required to contract for a minimum time period of having a portable display device 105 secured to a vehicle, a minimum amount of time displaying images, a minimum distance over which images are displayed, a minimum amount of time displaying images within a time period, or a minimum distance over which images are displayed within a time period. Drivers may also be required to pay fees for one or more of installation of a portable display device 105, maintenance of the portable display device 105, rental of the portable display device 105, and a security deposit for the portable display device 105.

In some embodiments described above with reference to FIGS. 1-7, an image or set of images can comprise a public service announcement or alert. In some embodiments, public service announcements or alerts can be configured to interrupt other images or sets of images or override other selections for the portable display device 105.

The various methods described above may be performed by any suitable means capable of performing the methods, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a device as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a device can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A portable display device, comprising:
   a rectangular frame;
   plural mounting bases, holding the rectangular frame, and adapted for connecting to a roof of a vehicle, and holding the rectangular frame on the vehicle;
   at least first and second digital display screens, each of the first and second digital display screens connected to the rectangular frame and configured to move between a display position in which a rear of the first digital display screen faces against a rear of the second digital display screen, and the face of both the first and second digital display screens are directed in a vertical viewing direction to have the faces viewed, and where in the vertical viewing direction, the first digital display screen can be seen from a first side of the vehicle, and the second digital display screen can be seen from a second side of the vehicle opposite to the first side of the vehicle, and a closed position in which the first and second digital display screens are each located inside the rectangular frame side by side and where a perimeter of an inside of the rectangular frame is large enough to contain outside edges of the first and second digital display screens located side by side, and the faces of the first and second digital display screens are each oriented horizontally in the closed position, and have the faces of the display screens facing towards the roof of the vehicle in the closed position, and to display images on the faces of the first and second digital display screens when in the open position;

a hinge, located between the first and second display screens, and further comprising at least one motor, which operates in a first direction to raise the display screens into the vertical viewing position, and operates in a second direction to lower the display screens into the horizontal position where it faces of the display screen are facing towards the roof of the vehicle;

a memory configured to store a plurality of images and to store image location association data, indicating images to be shown in different locations;

a location sensor configured to obtain a current geographic location; and a processor configured to:
select one or more of the plurality of images stored in the memory by using said current geographic location and said location association data to select at least one selected image to be displayed at the current geographic location; and to instruct the at least one digital display to display the at least one selected image, while at the current geographic location, and to store data indicative of an amount of time and location where the at least one selected image is displayed and to save data indicating an image that was displayed and a time at which the image was displayed.

2. The portable display device of claim 1, further comprising a communication module configured to receive data from an external device.

3. The portable display device of claim 2, wherein the received data includes the plurality of images.

4. The portable display device of claim 1, wherein the amount of time and location where the at least one selected image is displayed data is tracked and used to generate a bill for an advertiser for images shown on the first and second display screens, based on a time during which the images were shown on the first and second display screens.

5. The portable display device of claim 4, wherein the billing computer also bills different amounts for different kinds of vehicles.

6. The portable display device of claim 1, wherein the location sensor comprises a global positioning system device.

7. The portable display device of claim 1, wherein the location sensor comprises a radio-frequency identification device.

8. The portable display device of claim 1, further comprising one or more condition sensors configured to detect data related to a condition of the portable display device.

9. The portable display device of claim 8, wherein the condition sensors comprise one or more of an accelerometer, a temperature sensor, a gyroscope, a barometer, a motion sensor, a proximity sensor, a clock, and a timer.

10. The portable display device of claim 1, further comprising:
one or more wings, each wing configured to house one of the digital displays; and
one or more motors mechanically connected to the one or more wings, the motors configured to cause the transit of the one or more wings between the display and closed condition.

11. The portable display device of claim 10, further comprising one or more arms, each arm mechanically connected to one of the wings and to one of the motors, wherein the motors are configured to cause the arms to exert a force on the wings to tilt the wings in an upward position relative to one another, to hinge the wings relative to the hinge into the upward position until the displays are in the vertical viewing position and back to back while still being held at one end by the hinge, and to tilt the wings in a downward position relative to one another and relative to the hinge until the displays are in the horizontal position with the face of the display facing towards a roof of the vehicle and perimeters of the displays sitting side by side inside the rectangular frame and still being held at said one end by said hinge.

12. The portable display device of claim 10, wherein the processor is configured to instruct the one or more motors to activate in response to receiving an activation signal at the portable display device.

13. The portable display device of claim 12, further comprising a condition sensor, detecting an obstacle that would prevent the wings from unfolding into the open position, and preventing opening the wings when the obstacle is detected.

14. The portable display device of claim 13, wherein the processor prevents images from being displayed when the wings are in the closed position.

15. The portable display device of claim 14, wherein the mounting bases are configured to mount to a vehicle extrusion.

16. The portable display device of claim 1, further comprising a security system, the security system comprising one or more of locks, tracking devices, cameras, and kill switches.

17. A method for displaying an image using a portable display device, comprising:
obtaining a current geographic information;
selecting one or more images from a plurality of stored images, the selecting based on the current geographic information;
moving display components of the portable display device relative to a rectangular frame located on a roof of a vehicle, from a closed configuration in which each of first and second digital display screens of the portable display device are each oriented horizontally and have the faces of the display screens facing towards the roof of the vehicle, in which the first and second digital display screens are each located inside the rectangular frame side by side and where a perimeter of an inside of the rectangular frame is large enough to contain outside edges of the first and second digital display screens located side by side, and the faces of the first and second digital display screens are each oriented horizontally in the closed position, to a display configuration in which the first and second display screens are caused to move to a display position in which a rear of the first digital display screen faces against a rear of the second digital display screen, and the face of both the first and second digital display screens are directed in a vertical viewing direction to have the faces viewed, a hinge, located between the first and second display screens, and further comprising at least one motor, which operates in a first direction to raise the display screens into the vertical viewing position, and operates in a second direction to lower the display screens into the horizontal position where it faces of the display screen are facing towards the roof of the vehicle, based on a detection of geographic information and a determination that an image should be displayed at a current geographic location;

displaying the selected images on each of the first and second screens the portable display device; and storing data indicative of a time and a location where the at least one selected image is displayed.

18. The method of claim 17, further comprising receiving the plurality of stored
images from an external device.

19. The method of claim 17, wherein the obtaining a geographic location comprises receiving location information at a location sensor of the portable display device.

20. The method of claim 17, wherein the amount of time and location where the at least one selected image is displayed data is tracked and used to generate a bill for an advertiser for images shown on the first and second display screens, based on a time during which the images were shown on the first and second display screens.

21. The method of claim 20, wherein the billing sets an amount that is different for different kinds of vehicles.

22. The method of claim 17, further comprising terminating the displaying based on one or more of a signal from an external device, a selection on a user interface of the portable display device, the turning off of a vehicle, the presence of the portable display device in a particular geographic location, and data detected by one or more condition sensors.

23. The method of claim 17, further comprising moving display components of the portable display device from a display configuration to a closed configuration based on one or more of a signal from an external device, a selection on a user interface of the portable display device, the turning off of a vehicle, the presence of the portable display device in a particular geographic location, the activation of an override switch, and data detected by one or more condition sensors.

24. The method of claim 17, further comprising receiving one or more conditions for displaying the selected images on the portable display device, wherein the displaying the selected images is performed in accordance with the received conditions.

25. The method of claim 24, wherein the one or more conditions comprise one or more of time conditions, distance conditions, cost conditions, and vehicle conditions.

* * * * *